(12) United States Patent
Garcia Fernandez

(10) Patent No.: US 6,458,399 B1
(45) Date of Patent: Oct. 1, 2002

(54) PROCESS FOR OBTAINING AN EXTRACT OF SAFFRON

(75) Inventor: Eufrasio Garcia Fernandez, Churiana (ES)

(73) Assignee: Azafran Los Molinos de la Mancha, S.L., Churiana (ES)

(*) Notice: Subject to any disclaimer, the term of this patent is extended or adjusted under 35 U.S.C. 154(b) by 0 days.

(21) Appl. No.: 09/701,159

(22) PCT Filed: Mar. 22, 2000

(86) PCT No.: PCT/ES00/00099

§ 371 (c)(1),
(2), (4) Date: Feb. 5, 2001

(87) PCT Pub. No.: WO00/57981

PCT Pub. Date: Oct. 5, 2000

(30) Foreign Application Priority Data

Mar. 26, 1999 (ES) .................................. 9900621

(51) Int. Cl.[7] ........................ A23L 1/223; B01D 11/02
(52) U.S. Cl. ..................... 426/429; 426/431; 426/655; 426/638
(58) Field of Search ................................ 426/429, 431, 426/655, 638

(56) References Cited

U.S. PATENT DOCUMENTS 5,085,995 A * 2/1992 Otsuka et al.
5,700,464 A * 12/1997 Silver

OTHER PUBLICATIONS

TLC Preparative Purification of Picrocrocin, HTCC and Crocin from Saffron, Journal of Food Science. vol. 57. No. 3. 1992. pp. 714–716. Authors: Iborra et al.*
Preparative High–Performance Liquid Chromatographic Purification of Saffron Secondary Metabolites. Journal of Chromatography. vol. 648. 1993. pp. 187–190. Authors: Castellar et al.*

* cited by examiner

Primary Examiner—Anthony J. Weier
(74) Attorney, Agent, or Firm—Collen IP; Robert McDermott, Esq.

(57) ABSTRACT

The present invention consists of a process for obtaining an extract of saffron, which provides new essential characteristics as compared to those known in and similar to the present state of the art. The invention provides a process for obtaining an extract of saffron both in a liquid and in a solid state which makes possible a better commercialization and presentation of this product. This method reduces the manufacturing costs, and improves the quality in the aroma and coloring of the saffron produced.

16 Claims, No Drawings

PROCESS FOR OBTAINING AN EXTRACT OF SAFFRON

BACKGROUND OF THE INVENTION

Presently, due to the rise in the cost of manufacturing, manipulation, and distribution of saffron, the commercialization of the stigmas of saffron flower are being replaced by the commercialization of extracts of such stigmas.

The extracts of stigmas of saffron flower are currently obtained by a complicated, slow and expensive proceeding by means of leaching and evaporation, which increases the price of the final product.

It is also known that the artificial dyes commonly named "Tartracina" are commonly used, and that these dyes do not have the qualities of the extract obtained from saffron itself, and specifically from the stigmas of its flower.

DESCRIPTION OF THE INVENTION

The present invention consists of a process for obtaining an extract of saffron, both in a solid and in a liquid state, from the stigmas of the saffron flower. Such method generally consists of submitting the stigmas of saffron to a series of operative phases specifically dehydration, trituration by grinding, mixing with de-ionized water/96° alcohol, filtration and concentration under vacuum at a low temperature, obtaining the liquid extract of saffron.

Another characteristic of the process, object of the present invention is to get solid extract from saffron starting form the liquid extract before mentioned, by means of the operating phases of dehydration by lyophilisation of the liquid extract, followed by its vacuum and heating at a low temperature.

DETAILED DESCRIPTION OF A PREFERRED EMBODIMENT

The process for obtaining an extract of saffron, object of the present invention consists of submiting the stigmas of the saffron flower to the following operative phases:

1.—Dehydration
2.—Trituration by means of grinding to a size under 4 mm.
3.—Addition of a mixture (in proportion 1:1) of de-ionized water/96° alcohol in a proportion of 16 liters per 1 kilogram of grinded stigmas.
4.—The mixture is stirred and heated for approximately two hours at a temperature of approximately sixty degrees Centigrade.
5.—The mixture is filtered obtaining the enriched miscella in active product, the stigmas are mixed and stirred again with the mixture of de-ionized water/96° alcohol (1:1) for approximately two hours at a temperature of approximately sixty degrees Centigrade.
6.—The mixture is filtered extracting the miscella of the previous operation and proceeding to mix and stir the stigmas again with de-ionized water/96° alcohol (1:1) for approximately an hour at a temperature of approximately sixty degrees Centigrade.
7.—The miscella obtained in the previous operation is filtered.
8.—All previous obtained miscellas are filtered through tubes of 5 micras, eliminating impurities.
9.—The obtained miscellas are concentrated under vacuum at a relatively low temperature, preferably between 35 and 40° C., in order to obtain liquid extracts with solids comprised between 2 and 3%.

This liquid extract obtained in this way, has a composition of 8 kilograms of extract by each kilogram of used stigmas of saffron.

The obtained product, is a liquid with a high colorant power and the characteristic aroma of saffron, which is totaly soluble in water and also easy to dose on colouring the different meals, since 1 ml. or 2 ml. are enough to give the food the wanted dye and aroma.

Another object of the present invetion is the obtention of a solid extract from the liquid extract obtained in the aforementioned operative phases.

Specifically the obtained liquid extract, is submitted to the following operative phases:

A.—Dehydration by lyophilisation, freezing the liquid extract at −50° C.
B.—Vacuum sublimation under 0° C., eliminating the contained water.
C.—Poured and heated at a preferred temperature between 35 and 38° C., to eliminate the residual humidity, without losing its aroma or its colorant power.
D.—Rested of the resulting solid product for 48 hours.

The obtained product is a solid extract, specifically powdered extract, with approximately a proportion of usable material of 50%. That is to say, from a kilogram of stigmas of saffron, approximately a half kilogram of solid or powdered extract is obtained.

The obtained solid or powdered extract, has a high colorant power, so it must be mixed with a base of "maltodextrina", so that it can be dosed in one-use envelopes, according to the different dyes which the different meals or foods must have.

With the obtained extracts, both in a solid and in a liquid state, the use of saffron is simplified, because it is not necessary to grind the threads of saffron before its use, and besides a colourant of the natural kind is obtained, which offers great advantages with respect to the use of the artificial and commonly used colorant denominated "Tartracina".

Once the nature of the improvements of the invention has been conveniently described, it is hereby stated to the opportune effects, that the same is not limited to the exact details of this report, but on the contrary, the opportune modifications will be introduced in it, as long as the essential characteristics of the same are not altered, which characteristics are stated in the following claims:

What is claimed is:

1. A process for obtaining an extract of saffron, comprising:

grinding dry stigmas of saffron flowers to produce ground stigmas, mixing the ground stigmas with a water and alcohol mixture to produce a stigma mixture, heating and stirring the stigma mixture to produce a heated mixture, filtering the heated mixture to produce a filtered mixture, and concentrating the filtered mixture under vacuum to produce a liquid extract of saffron.

2. The process of claim 1, wherein the water and alcohol mix includes de-ionized water and alcohol in substantially equal quantities.

3. The process of claim 1, wherein the ground stigmas and water and alcohol mixture are provided in a proportion of approximately 16 liters of water and alcohol mixture to 1 kilogram of ground stigmas.

4. The process of claim 1, wherein the heating and stirring the stigma mixture includes
- heating and stirring the stigma mixture to produce an intermediate heated mixture,
- filtering the intermediate heated mixture to produce an intermediate filtered mixture, and
- heating and stirring the intermediate filtered mixture to produce the heated mixture.

5. The process of claim 4, wherein the heating and stirring of the intermediate stigma mixture includes
- heating and stirring the intermediate stigma mixture to produce an initial intermediate heated mixture,
- filtering the initial intermediate heated mixture to produce an initial intermediate filtered mixture, and
- heating and stirring the initial intermediate filtered mixture to produce the intermediate heated mixture.

6. The process of claim 5, wherein
- the heating and stirring the stigma mixture occurs for approximately two hours at approximately sixty degrees Centigrade,
- the heating and stirring of the intermediate stigma mixture occurs for approximately two hours at approximately sixty degrees Centigrade, and
- the heating and stirring of the initial intermediate filtered mixture occurs for approximately one hour at sixty degrees Centigrade.

7. The process of claim 1, wherein
filtering the heated mixture includes filtering the heated mixture through tubes of five micra.

8. The process of claim 1, wherein
concentrating the filtered mixture under vacuum occurs at a temperature below forty-five degrees Centigrade.

9. The process of claim 1, further including lyophilizing the liquid extract of saffron to produce a solid extract of saffron.

10. The process of claim 9, wherein lyophilizing the liquid extract of saffron includes
- freezing the liquid extract of saffron to produce a frozen extract,
- vacuum sublimating the frozen extract to produce a sublimated extract,
- heating the sublimated extract to produce the solid extract of saffron.

11. The process of claim 10, wherein freezing the liquid extract of saffron occurs at approximately minus fifty degrees Centigrade.

12. The process of claim 10, wherein vacuum sublimating the frozen extract occurs below zero degrees Centigrade.

13. The process of claim 10, wherein heating the sublimated extract occurs at a temperature that eliminates residual humidity.

14. The process of claim 13, wherein the temperature is below forty degrees Centigrade.

15. The process of claim 10, further including resting the solid extract of saffron for more than one day.

16. The process of claim 11, wherein the liquid extract of saffron includes solids between 2 and 3 percent.

* * * * *